(12) United States Patent
Agarwalla et al.

(10) Patent No.: US 10,198,504 B2
(45) Date of Patent: *Feb. 5, 2019

(54) TERMS FOR QUERY EXPANSION USING UNSTRUCTURED DATA

(71) Applicant: International Business Machines Corporation, Armonk, NY (US)

(72) Inventors: Lalit Agarwalla, Bangalore (IN); Ankur Parikh, Bangalore (IN); Avinesh Polisetty Venkata Sai, Kakinada (IN)

(73) Assignee: International Business machines Corporation, Armonk, NY (US)

( * ) Notice: Subject to any disclaimer, the term of this patent is extended or adjusted under 35 U.S.C. 154(b) by 514 days.

This patent is subject to a terminal disclaimer.

(21) Appl. No.: 14/739,261

(22) Filed: Jun. 15, 2015

(65) Prior Publication Data

US 2016/0147870 A1 May 26, 2016

Related U.S. Application Data

(63) Continuation of application No. 14/552,913, filed on Nov. 25, 2014, now Pat. No. 10,055,485.

(51) Int. Cl.
*G06F 17/30* (2006.01)

(52) U.S. Cl.
CPC .. *G06F 17/30684* (2013.01); *G06F 17/30654* (2013.01); *G06F 17/30672* (2013.01)

(58) Field of Classification Search
CPC ......... G06F 17/30684; G06F 17/30654; G06F 17/30672
See application file for complete search history.

(56) References Cited

U.S. PATENT DOCUMENTS

| 6,038,560 A | 3/2000 | Wical |
| 7,548,910 B1 | 6/2009 | Chu et al. |
| 8,473,279 B2 | 6/2013 | Al-Shammari |

(Continued)

FOREIGN PATENT DOCUMENTS

EP 2104044 A1 9/2009

OTHER PUBLICATIONS

Stokes, Exploring criteria for successful query expansion in the genomic domain, Oct. 29, 2008, pp. 17-50.*

(Continued)

*Primary Examiner* — Albert M Phillips, III
(74) *Attorney, Agent, or Firm* — Daniel R. Simek

(57) ABSTRACT

A processor determines a set of terms frequently occurring within unstructured data associated with criteria of a query. The processor analyzes the unstructured data to match a term of the set of terms, to criteria of the query. Matching terms are retained and unmatched terms are checked for semantic similarity to terms of the criteria to determine an inferred match of the term of the unstructured data to terms of the criteria of the query. In response to determining an inferred match, the inferred match term is added to the second set of terms, and the processor compares the second set of terms to the terms of the criteria of the query, and removes matching terms, resulting in a third set of terms added to the set of criteria terms of the query. The additional query terms will enhance the recall without diluting the precision.

8 Claims, 6 Drawing Sheets

(56) References Cited

U.S. PATENT DOCUMENTS

| | | |
|---|---|---|
| 8,521,731 B2 | 8/2013 | Broder et al. |
| 8,650,186 B2 | 2/2014 | Beck et al. |
| 9,690,861 B2 | 6/2017 | Boloor et al. |
| 9,721,016 B2 | 8/2017 | Gruber |
| 2009/0077065 A1 | 3/2009 | Song et al. |
| 2010/0063948 A1 | 3/2010 | Virkar et al. |
| 2011/0004628 A1* | 1/2011 | Armstrong ........ G06F 17/30672 707/778 |
| 2011/0078145 A1* | 3/2011 | Chung ................ G06F 19/3443 707/737 |

OTHER PUBLICATIONS

IBM Appendix P, list of IBM patents or patent applications treated as related, pp. 1-2, dated Jun. 15, 2015.

"Query expansion", Wikipedia, the free encyclopedia, page last modified Jul. 23, 2014, pp. 1-2, <http://en.wikipedia.org/wiki/Query_expansion>.

"Unified Medical Language System® (UMLS®)", First published: Jul. 29, 2009, Last updated: Jul. 18, 2014, Last reviewed: Jul. 18, 2014, 1 page, <http://www.nlm.nih.gov/research/umls/>.

"New Terms for Query Expansion Using Unstructured Data", U.S. Appl. No. 14/552,913, filed Nov. 25, 2014, pp. 1-34.

Song, Keyphrase Extraction-Based Query Expansion in Digital Libraries, 2006, pp. 202-209.

Data English Test Questions (Topics) Files List, TREC5-TREC7 Ad-Hoc Test Sets, 2010, 63 pages.

\* cited by examiner

| CRITERIA TEST: "HAS CARDIAC DYSSYNCHRONY; DEFINED AS QRS DURATION GREATER THAN 120 MS" ~240 |
|---|
| EVIDENCE TERMS AND PHRASES |
| QRS DURATION 88 ~ 210 |
| QRSD INTERVAL 136 ~ 215 |
| PAROXYSMAL ATRIAL FIBRILLATION ~ 220 |
| LEFT BUNDLE BRANCH ~ 225 |
| QRS DURATION LESS THAN 120 ms |
| (QRS > 120 ms) ~ 230 |
| DOCUMENTED LEFT BUNDLE BRANCH BLOCK ~ 235 |
| QRS HAS INTERVENTRICULAR CONDUCTION DELAY OF ABOUT 100 ms. OTHER TIMES PATIENT HAS A LEFT BUNDLE BRANCH BLOCK WITH QRS UP TO 170 ms. |
| QRSD OF 154 ms |
| QRS DURATION IS 156 MILLISECONDS |

| KEY PHRASE | FREQUENCY |
|---|---|
| QRS | 6 |
| DURATION | 4 |
| LEFT BUNDLE BRANCH BLOCK | 3 |
| QRSD | 2 |
| MS | 4 |
| MILLISECONDS | 3 |
|  |  |

~250

FREQUENCY LIST - L1

FIG. 2B

| EVIDENCE TERMS AND PHRASES | MATCH WITH LIST 1 |
|---|---|
| QRS DURATION 88 | YES |
| QRSD INTERVAL 136 | YES |
| PAROXYSMAL ATRIAL FIBRILLATION | NO |
| LEFT BUNDLE BRANCH | YES |
| QRS DURATION LESS THAN 120 ms | YES |
| (QRS > 120 ms) | YES |
| DOCUMENTED LEFT BUNDLE BRANCH BLOCK | YES |
| QRS HAS INTERVENTRICULAR CONDUCTION DELAY OF ABOUT 100 ms. OTHER TIMES PATIENT HAS A LEFT BUNDLE BRANCH BLOCK WITH QRS UP TO 170 ms. | YES |
| QRSD OF 154 ms | YES |
| QRS DURATION IS 156 MILLISECONDS | YES |

| KEY PHRASE | FREQUENCY |
|---|---|
| QRS | 6 |
| DURATION | 4 |
| LEFT BUNDLE BRANCH BLOCK | 3 |
| QRSD | 2 |
| MS | 4 |
| MILLISECONDS | 3 |
| PAROXYSMAL ATRIAL FIBRILLATION | NEWLY ADDED |

~320

330 — (pointing to PAROXYSMAL ATRIAL FIBRILLATION row)

SECOND LIST (L2) WITH NEW TERM ADDED

FIG. 3B

| KEY TERMS AND PHRASES | MATCH WITH CRITERIA | KEEP / DELETE? |
|---|---|---|
| QRS | YES | DELETE |
| DURATION | YES | DELETE |
| LEFT BUNDLE BRANCH BLOCK | NO | KEEP |
| QRSD | NO | KEEP |
| MS | YES | DELETE |
| MILLISECONDS | YES | DELETE |
| PAROXYSMAL ATRIAL FIBRILLATION | NO | KEEP |

| KEY TERMS AND PHRASE |
|---|
| LEFT BUNDLE BRANCH BLOCK |
| QRSD |
| PAROXYSMAL ATRIAL FIBRILLATION |

~420

FINAL LIST (L3) - ADDITIONAL QUERY TERMS

FIG. 4B

TERMS FOR QUERY EXPANSION USING UNSTRUCTURED DATA

BACKGROUND OF THE INVENTION

The present invention relates generally to the field of information retrieval, and more particularly to query expansion of terms of a search, based on data used for other purposes.

Query expansion (QE) is the process of reformulating a seed query to improve retrieval performance in information retrieval operations. In the context of computer-based searches, query expansion involves evaluating a user's input and expanding the search query to generate additional document matches. Query expansion involves techniques such as finding synonyms of words and finding various morphological forms of words, and including the synonyms and morphological forms of words in the search query.

In information retrieval, precision of the retrieval is the fraction of retrieved instances that are relevant, while recall is the fraction of relevant instances that are retrieved. Both precision and recall are therefore based on relevance of a set of criteria used in a search query. For a given amount of search results, high precision refers to a search returning results that are substantially more relevant than irrelevant. High recall refers to the search returning a quantity that includes most of the relevant results. Algorithms used for information retrieval, such as a criteria validation system, consider both high precision and high recall to be extremely valuable. Including all related terms from a knowledge base, may result in obtaining higher recall results; however, the overall precision of the results may suffer. Both aspects are important in information retrieval.

A criteria validation system refers to a system in which a set of unstructured text criteria is being validated or evaluated against unstructured data content to determine if the condition of the criteria is "met" or "not met" in the unstructured data. The unstructured data is often text content and the unstructured criteria often includes and/or excludes particular words or phrases. The validation determines if the conditions of the criteria are found in the unstructured data content, and if the conditions are met, the content is considered a match to the criteria, based on examination and analysis of the unstructured data content, which is sometimes referred to as evidence.

Situations in which the criteria of a query includes limited information or is specified in a particular manner, may result in difficulty making decisions of matching text content to the criteria. The recall of the query based on the limited criteria terms (or phrases) may exclude alternative labels or descriptions of the criteria, or reject text content containing alternative expression of the criteria.

SUMMARY

According to one embodiment of the present invention, a method for determining additional terms to expand a query, is provided. A processor receives unstructured data that includes a first set of terms. The processor selects a second set of terms from the first set of terms of unstructured data, based on a pre-determined frequency of occurrence of a term within the first set of terms. The processor adds additional terms to the second set of terms, in response to a determination that a term of the first set of terms is an inferred match to a term of a set of criteria terms of a query, based on a semantic analysis. The processor generates a third set of terms, based on removing a term of the second set of terms in response to the term of the second set of terms matching a term of the set of criteria terms of the query, and the processor generates an expanded query, based on adding the third set of terms to the set of criteria terms of the query.

BRIEF DESCRIPTION OF THE DRAWINGS

FIG. 2A depicts an example list of evidence text derived from unstructured content data of FIG. 1, in accordance with an embodiment of the present invention.

FIG. 2B depicts an example first list of potential additional terms derived from the example list of evidence text of FIG. 2A, in accordance with an embodiment of the present invention.

FIG. 3A depicts an example of evidence text derived from the unstructured content data of FIG. 2A, indicating a match of the terms and phrases of the evidence text to the first list of potential new terms of FIG. 2B, in accordance with an embodiment of the present invention.

FIG. 3B depicts an example second list of potential additional terms, in accordance with an embodiment of the present invention.

FIG. 4A depicts an example list of potential additional terms, in accordance with an embodiment of the present invention.

FIG. 4B depicts a third list of additional query terms, in accordance to an embodiment of the present invention.

DETAILED DESCRIPTION

Figure 1:
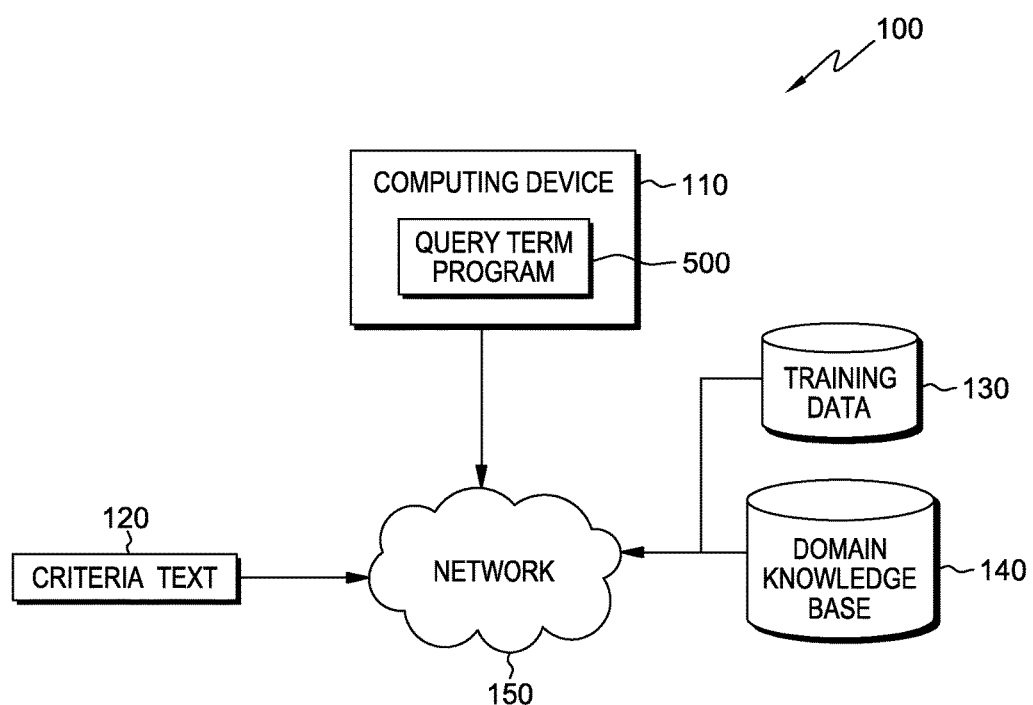
FIG. 1 is a functional block diagram illustrating a distributed data processing environment, in accordance with an embodiment of the present invention.

Embodiments of the present invention provide a method, computer program product, and computer system for improving the recall of a search by adding additional query terms mined from existing data used for other purposes, without reducing the precision of the search.

Embodiments of the present invention recognize that queries based on unstructured data, such as text or text-based terms and phrases, may produce an amount of query results that is precise, but limited in the amount of recall produced by the query. The recall limitation may be due to a narrow set of terms used in the query criteria. Additional criteria terms added to the query may improve the recall response to the query, and expanding query criteria terms by selecting near-matching terms and terms related to the original query criteria, maintains the precision of query results.

Embodiments of the present invention use criteria-related unstructured data, such as training data, which is used as evidence data in supervised training of criteria or policy decision making functions. Embodiments of the present invention use the unstructured data to identify additional query terms and/or phrases that are semantically related to the terms and/or phrases of the query criteria, and include the additional terms and/or phrases extracted from the training data in the criteria of the query. Frequency pattern mining is applied to the unstructured data and a first list, or set of frequently observed terms and phrases is obtained (list L1). A pre-determined frequency count is applied and the terms and phrases of the unstructured data, meeting or exceeding the frequency count, are included in the first list (L1). The frequency list of terms and/or phrases is compared to the set of terms and phrases of the unstructured data to determine if there is a match. If a match is determined, the term or phrase remains as part of the list. If a match is not determined from a term instance of the training data, the term is extracted and using a semantic analysis, a similarity relationship to a term of the query criteria is determined. If there is an inferred similarity match, the term is added to the set, or first list L1, forming a second set of terms or list L2.

The terms and phrases from the second list, L2, are compared to the terms and phrases of the criteria, and if a match is determined, the term and/or phrase is deleted from the second list, effectively removing redundant terms from criteria terms of the query; however, if a term or phrase of the second set, or list L2, does not match the terms and phrases of the criteria, the term or phrase is kept, forming a third set, or list L3. The third list terms and/or phrases are included in the query criteria, which improves the recall of the search results. Because additional terms and/or phrases were extracted based on an implied similarity based on a semantic relationship with terms and/or phrases of the query criteria, the addition of the third list terms and phrases to the criteria will avoid impact to the precision of the results. It is acknowledged that terms or phrases or both terms and phrases, may be involved in query criteria and the unstructured data making up training data. Hereafter the consideration of either terms or phrases, and the consideration of both terms and phrases, will be simply expressed as "terms and phrases".

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed data processing environment 100, in accordance with an embodiment of the present invention. Distributed data processing environment 100 includes computing device 110, shown hosting query term program 500, criteria text 120, training data 130, and domain knowledge base 140, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing device 110, criteria text 120, training data 130, domain knowledge base 140, and the operation of query term program 500, within distributed computer processing environment 100, in accordance with embodiments of the present invention.

Domain knowledge base 140 is a corpora of information and data associated with the general subject matter to which the criteria of the query is associated. In one embodiment of the present invention, domain knowledge base 140 may be a database, or a group of connected databases. In another embodiment, domain knowledgebase 140 may be a searchable storage device that includes files and data. Domain knowledge base 140 may include term and phrase definition, descriptions, and information semantically related terms and phrases associated with the subject matter. For example, in the medical insurance field, domain knowledge base 140 may include a dictionary, such as the unified medical language system (UMLS), used to extract terms or phrases determined to have a semantic relationship with a target term or phrase.

Training data 130 is a collection of manually generated data, often used in binary criteria validation systems. In one embodiment of the present invention, the contents of training data 130 is used to manually validate criteria established for decision making. In another embodiment, training data 130 is used for training machine-based decision making. The manually generated data, referred to herein as training data, is sometimes used in the generation of scoring of evidence. Evidence scoring is a technique sometimes used in machine learning to determine the likelihood of one instance of evidence to meet a certain criteria or to determine a better instance of evidence between multiple instances. Training data 130 is unstructured data, often text-based, and may be included in a database, or may be a file stored in a file storage device on a local or remote system. Training data is often associated with criteria text that is pre-determined or constant, and includes evidence text that substantiates a machine-based decision, and having a criteria decision of "met" or "not met". For example, in the medical insurance field, approval by an insurance firm may require a validation that a patient meets certain criteria. The insurance approval/rejection decisions of the patient, along with selected evidence text from the patient's medical history, which may be manually generated by the insurance company over time, may function as labelled training data. In one embodiment of the present invention, training data 130 may be used in conjunction with domain knowledge base 140 to generate a semantic relationship or inferred match of criteria of a search query.

Criteria text 120 is unstructured data input to establish criteria for a search query. Criteria text 120 is often input as text that includes words or symbols as terms, or groups of words or symbols, as phrases. Criteria text 120 may input from a client computing device, a server computer, a mobile computing device, such as a laptop, a tablet, a smartphone or a personal digital assistant (PDA) device. Criteria text 120 may be received by query term program 500, residing on computing device 110, by network connection to network 150, as depicted in FIG. 1. In some embodiments of the present invention, criteria text 120 may be input directly to computing device 110, by an input device connected to computing device 110 (not shown), and received by query term program 500. In some embodiments, criteria text 120 is the unstructured criteria input to perform a search query, and may include limited terms and/or phrases that may have the effect of narrowing the search query and producing limited recall results.

Computing device 110 may be a desktop computing device, a rack mounted computing device, a blade server, a management server, a mobile computing device, or any other electronic device or computing system capable of performing program instructions, and receiving and sending data. In other embodiments, computing device 110 may represent a computing system utilizing multiple computers as a server system, such as in a cloud computing environment. In yet other embodiments, computing device 110 can be a laptop computer, a tablet computer, a netbook computer, a personal computer (PC), a desktop computer, a personal digital assistant (PDA), a smart phone, or any programmable electronic device capable of communicating with training data 130 and domain knowledge base 140 via network 150. In another embodiment, computing device 110 can be a computing system utilizing clustered computers and components (e.g., database server computer, application server computers, etc.) that act as a single pool of seamless resources when accessed within distributed computer processing environment 100. Computing device 110 may include internal and external hardware components, as depicted and described with reference to FIG. 6.

Computing device 110 is depicted as including query term program 500, which includes machine instructions to perform a series of operations resulting in additional terms and/or phrases to include in query criteria of a criteria validation system. Query term program 500 analyzes the unstructured data, for example training data, or evidence data, and generates a first list that includes a frequency of the terms and phrases of the unstructured data. Query term program 500 omits non-descriptive words such as articles, prepositions, conjunctions, etc., and applies a configurable frequency limit to generate the first list. Query term program 500 compares the list with each instance of training data, and determines if terms and phrases of the training data instance, or evidence data instance, match a term or phrase of the first list. If a match is determined the term and/or phrase remains on the list, if the training data instance does not include a match, then valid terms and/or phrases of the training data instance, or evidence data instance, that have semantic relationship with terms and/or phrases of the criteria, are extracted and added to the list.

Query term program 500 iterates the comparison of the first list with the individual instances of training data, or evidence data, hereafter referred to as training data, and generates a second list by adding the extracted terms and/or phrases from the training data instances. Query term program 500 removes from the second list, terms and/or phrases matching terms and phrases of the criteria, resulting in a third list, which is added to the query terms to enhance the search recall. The search precision will be maintained due to the semantic relationship of the terms and/or phrases extracted from the training data instances.

FIG. 2A depicts an example list of evidence text 200 derived from unstructured content of the training data of FIG. 1, in accordance with an embodiment of the present invention. In the example, a medical criteria text 240 has been established that includes the text expression: (the patient) "has cardiac dyssynchrony; defined as QRS duration greater than 120 ms". Evidence list 200 includes multiple entries of evidence text data contained in the example training data. Some of the evidence text entries includes: evidence 210, evidence 215, evidence 220, evidence 225 evidence 230, and evidence 235. Evidence 210 includes key text terms found in criteria text 240, such as "QRS" and "duration"; however, the numerical value of "88" is not greater than 120 (milliseconds) and the criteria is "not met" by evidence 210.

Evidence 215 includes a value 136, which is greater than the criteria value of 120 (ms); however, it is unclear whether the text term "QRSD" should be considered as having met the criteria since it is not an exact match of the term "QRS" in the criteria. Evidence 230 includes the term QRS, a greater-than symbol, the value 120, and the term "ms", and thus is considered to have met criteria 240. Evidence 220, 225, and 235, of evidence text 200, include text phrases that do not match the terms and phrases in criteria text 240.

In one embodiment of the present invention, training data 130 (FIG. 1) is generated by reviewing evidence, for example, evidence text 200, and validating the instances of evidence to the criteria, such as criteria text 40. As some evidence instances, such as evidence 215, 220, 225, and 235, appear not to match the terms and phrases of criteria text 240, an existing knowledge base of the subject matter associated with the criteria, such as domain knowledge base 140, is used to determine semantic relationships that may exist between terms and phrases of evidence 215, 220, 225, and 235, and the terms and phrases of criteria text 240. Determining that a semantic relationship exists between the terms and phrases of evidence text 200 and criteria text 240 results in an inference or near-match, which is also referred to as an inferred match.

FIG. 2B depicts an example first list 250, including potential additional terms derived from the example list of evidence text of FIG. 2A, in accordance with an embodiment of the present invention. To enhance the recall of the query criteria, additional terms with relevance and semantic relationship to the query criteria are determined from the training data. FIG. 2B includes first list 250, which includes a listing of terms and phrases found within the training data, such as evidence text 200, and a corresponding frequency of occurrence of the terms and phrases. In some embodiments of the present invention, a configurable frequency count is used to establish a minimum qualifying number of occurrences of terms and phrases to be included on first list 250. In other embodiments, all frequencies are included in first list 250. In some embodiments, the occurrence of text representing particular parts of language, are omitted from frequency considerations. For example, articles, such as "a" and "the", prepositions, such as "of, for, at, with, etc.", and conjunctions, such as "and", "but", "or", etc. In other embodiments of the present invention, other lexical categories of words may be omitted.

Embodiments of the present invention generate a list of terms and phrases occurring within the training data, which meet or exceed a configurable level of frequency of occurrence. First list 250 indicates term and phrase frequencies ranging from 6 to 2 occurrences within evidence text 200. The frequently occurring terms and phrases are included in first list 250 (L1) and are added to the list based on their frequency of occurrence in the training data and are not dependent on whether the term and phrase meets the query criteria.

FIG. 3A depicts an example of evidence text 310 derived from the unstructured content of the training data of FIG. 2A, indicating a match of the evidence text terms and phrases to the first list of potential new terms of FIG. 2B, in accordance with an embodiment of the present invention. Having generated a first list containing terms and phrases frequently occurring in the training data, the terms and phrases of the first list are compared to the terms and phrases of each instance of the training data. Iterating through the training data instances each key term and phrase of the training data instance is checked for a match with terms and phrases of the first list. If there is a match, the term and phrase are kept on the list. If there is no match, then a semantic analysis of the terms and phrases of the training data instance is performed to extract additional terms and phrases having a semantic relationship with the criteria. Key terms and phrases of the training data instance are validated using a knowledge base of subject matter associated with the criteria, such as domain knowledge base 140.

If a semantic relationship of the key term and phrase of the training data instance with the query criteria is determined, the key term and phrase of the training data instance is added to the first list. Additions of new semantically related terms and phrases to the first list, results in forming second list 320. For example, the term, paroxysmal atrial fibrillation, from a training data instance of FIG. 3A, does not match terms and phrases included in first list 250 (L1).

FIG. 3B depicts an example second list 320 of potential additional terms, in accordance with an embodiment of the present invention. In one embodiment of the present invention, key terms and phrases from the instances of training data on evidence text 310 that match the terms and phrases of first list 250 (FIG. 2B), remain on the list. The terms and phrases from evidence text 310, of FIG. 3A, that have been determined to not match the terms and phrases of first list 250, such as unmatched term 330, are compared to information included in domain knowledge base 140. If a semantic relationship to the query criteria is established, the un-matched terms and phrases of term FIG. 3A are added to first list 250, forming second list (L2) 320. All the terms and phrases of first list 250 remain on second list 320, and in addition un-matched phrase 330, paroxysmal atrial fibrillation, which is semantically related to terms and phrases of the criteria, is added to second list 320.

In the example that uses medical criteria terms and phrases, it is common for physicians and lab technicians to use alternate terms to refer to a medical condition, diagnosis, lab result, or item of focus, using a term or phrase that may not be used by others. The information may be valuable for criteria validation decisions, and should not be missed or lost. In this example QRSD is often used for "QRS Duration" and this new term "QRSD" may not be available in any domain knowledge sources. This invention will be able to extract this kind of term variation, such as "QRSD" for the purpose of query expansion.

FIG. 4A depicts an example list of potential additional terms, in accordance with an embodiment of the present invention. The key terms and phrases of second list 320 (FIG. 3B) is then compared to the terms and phrases of the query criteria. The key term and phrase of second list 320 is removed from the list if there is a match to a term or phrase found in the query criteria. Term comparison table 410 illustrates the key terms and phrases established in second list 320, and indicates whether a match of the query criteria terms and phrases was determined. Term comparison table 410 also depicts the resulting action to be taken of whether to keep or delete the term and phrase.

Figure 5:
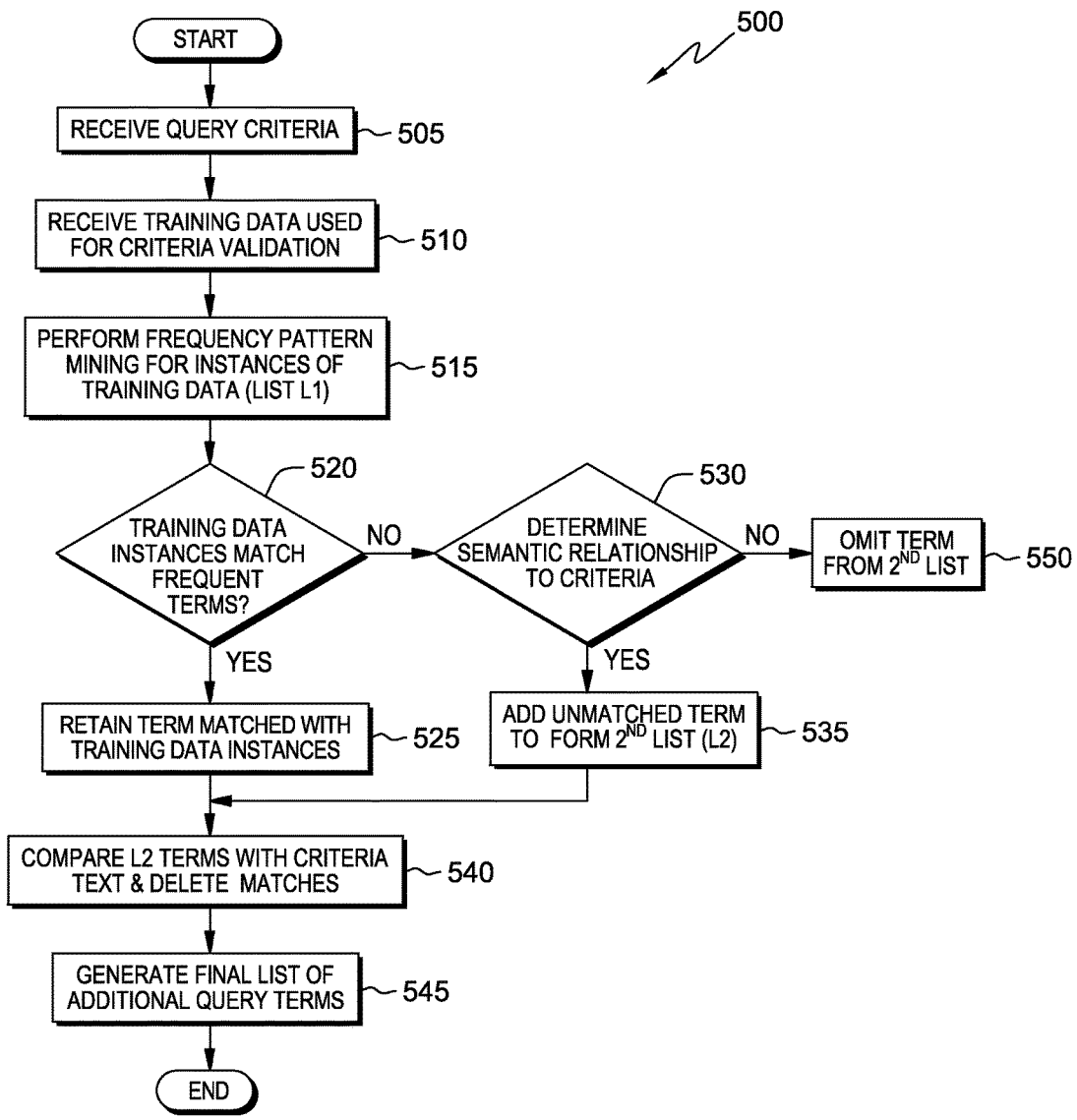
FIG. 5 is a flowchart depicting operations performed by a query term program operating on a server computer within the distributed data processing environment of FIG. 1, in accordance with an embodiment of the present invention.

FIG. 4B depicts a third list of additional query terms, in accordance to an embodiment of the present invention. Implementing the "keep/delete" actions of term comparison table 410 results in third list 420. Third list 420 is an example list of the final additional terms and phrases to be added to the query criteria to enhance the recall of the search results and maintain the precision of the results. Removing the terms and phrases that match the criteria terms and phrases avoids redundancy in query criteria FIG. 5 is a flowchart depicting operational performed by query term program 500, operating on a server computer within the distributed data processing environment of FIG. 1, in accordance with an embodiment of the present invention. Query term program 500 performs the operations described above in reference to FIGS. 2A, 2B, 3A, 3B, 4A, and resulting in additional query terms and phrases depicted in FIG. 4B. Query term program 500 makes use of existing query criteria, received as criteria text 120. Existing criteria-relevant, unstructured data, such as training data 130, which is evidence used in training criteria validation decision making algorithms, and semantic relationship information included in domain knowledge base 140, also support the operational performance of query term program 500. In the discussion of the operational activities of query term program 500, the word "term" will be used for brevity and clarity, but one skilled in the art will recognize that "term" is applicable to one or a combination of terms and phrases associated with instances of unstructured data and query criteria. Some embodiments of the present invention, such as the example discussed below, make use of unstructured data that includes training data that has a medical subject matter. The training data may have been developed for other purposes, such as developing a machine learning model for a criteria validation system, but is used by query term query term program 500 to enhance the query criteria with additional terms and phrases. Reference to the training data for purposes of describing embodiments of the present invention in the context of an example, should not be construed as limiting, as implementations using other unstructured data sources are possible.

Referring now to description of the operations of FIG. 5, query term program 500 receives query criteria (505). Query criteria is received from an input source and includes text terms used in the criteria of a query. For example, criteria text 120 (FIG. 1) is sent via network 150 to computing device 110 and is received by query term program 500. In one embodiment, text terms of received criteria may be for a medical criteria validation system used by a medical insurance carrier. The received medical criteria terms may be, for example, (the patient) " . . . has cardiac dyssynchrony; defined as QRS duration greater than 120 ms".

Having received the query criteria, query term program 500 accesses unstructured data, which may have been generated for some other purposes, but related to the subject matter of the received query criteria. From the unstructured data, query term program 500 receives training data used for criteria validation (510). In some embodiments of the present invention, in which a criteria validation system is trained for decision making using criteria that includes text-based terms and phrases, training data for the validation system is available and includes terms and phrases related to the subject of the criteria. For example, training data 130 may include multiple instances of training data used to train decision making for a criteria validation system. Some of the training data related to criteria text: (the patient) " . . . has cardiac dyssynchrony; defined as QRS duration greater than 120 ms", may be listed in evidence text 200 (FIG. 2A). In some embodiments of the present invention, query term program 500 accesses and retrieves the training data. In other embodiments, query term program 500 requests the training data from training data 130, and receives the training data via network 150.

Having received the training data, query term program 500 performs a frequency pattern mining operation for the instances of training data (515). For the terms and phrases within the instances of training data, other than particular lexical categories, such as articles, prepositions, conjunctions, etc., which is configurable, query term program 500 performs a frequency count. Upon determining a valid term or phrase within an instance of training data, the frequency count for that term is incremented, and the frequency count and associated list of terms forms a first list (L1). A valid term or phrase may be one in which the term or phrase matches a corresponding term or phrase in the query criteria, may exclude certain lexical categories of terms, and meets or exceeds a frequency target that is configurable.

For example, an instance of training data in evidence text 200, may include evidence 210, in which the terms, QRS, duration, and 88 occur. A frequency count of one is set for each term. Another instance of training data, such as evidence 230, includes the terms QRS, the greater-than symbol, 120, and the term "ms". The frequency count of each term is incremented for each instance of occurrence of the term. The term QRS would be incremented to a frequency count of two. The result of completing the frequency pattern mining of the instances of training data is an initial list of additional terms and phrases, otherwise referred to as first list 250 (L1). First list 250 includes terms and phrases with a frequency count at or exceeding a configurable count, for example a frequency of two, as depicted in first list 250 of FIG. 2B.

Having generated an initial list of additional terms and phrases, query term program 500 determines whether the terms included in the training data instances match the frequent terms (decision 520). Comparing the frequent terms and phrases to the terms and phrases in each instance of training data, identifies unique or low-occurrence terms and phrases. Query term program 500 compares the frequent terms of first list 250 to the terms of each instance of training data, and determining that the term of the training data instance matches a term of first list 250, (520, "YES" branch), query term program 500 retains the term that matches the training data instance term (525).

For example, query term program 500 compares the terms of an instance of training data including evidence 210 to the frequent terms of first list 250. Evidence 210 includes the term QRS, which matches a frequent term of first list 250. Similarly, the term, duration, matches a frequent term of first list 250. Both terms QRS and duration, remain on the list, and additional matches with subsequent training data instance terms may occur.

Determining that the term of the training data instance does not match a term of first list 250, (520, "NO" branch), query term program 500 determines whether a semantic relationship exists between the unmatched term and terms of the criteria (decision 530). Query term program 500 performs a semantic analysis of the unmatched term by accessing a source of semantic information related to the subject matter of the criteria, such as knowledge base 140, for example. The source may be a dictionary of terms and phrases associated with a particular subject matter, for example, a medical dictionary. Query term program 500 determines if the unmatched term is semantically related to terms found in the query criteria, such as criteria text 240 (FIG. 2A).

Determining that the unmatched term is semantically related to terms of the query criteria (530, "YES" branch), query term program 500 adds the unmatched term to form a second list (L2) (535). The unmatched term is semantically analyzed and compared to semantic information related to the criteria of the query, such as criteria text 240. The semantic analysis confirms a relationship that may be inferred, or a near-match based on the semantic information related to the criteria and the semantic analysis of the unmatched term. The semantically confirmed unmatched term is added to first list 250, which includes the retained terms. When all instances of training data have been compared to the terms of first list 250, the resulting list of adding unmatched terms, generates second list 320 (FIG. 3B).

For example, unmatched term 320, is compared to the frequent terms of first list 250 and is unmatched. Unmatched term 320, which includes the terms: paroxysmal atrial fibrillation, is semantically analyzed and compared to semantic information related to criteria text 240, included in domain knowledge base 140. Determining that the analysis of unmatched term 320 indicates a relationship to criteria text 240, unmatched term 320 is added to first list 250. In some embodiments of the present invention, if there is more than one unmatched term in an instance of training data, the unmatched term that is most related to the query criteria is added to first list 250. In other embodiments, a semantic relationship scoring threshold may be used to determine if the unmatched term is added to first list 250.

Determining that the unmatched term is not semantically related to the terms of the query criteria (530, "NO" branch), query term program 500 omits the term from the second list (L2) (550). The results of semantic analysis of the unmatched term indicates that the term is not semantically related to the terms of the query criteria. The term is not added to first list 250 and is not part of forming second list 320.

Having generated the second list that includes terms from training data instances that match a term included in the frequency list, and unmatched terms that are semantically related to the terms of the query criteria, query term program compares the second list of terms with the criteria text of the query and deletes matches from the second list (540). Terms of the second list that match terms found in the query criteria are redundant for enhancing the recall of a query, and are therefore removed from the second list. For example, second list 320 includes the term QRS, which is also included in criteria text 240 (FIG. 2A). Because the term QRS of second list 320 is matched by QRS in criteria text 240, the term QRS is deleted from second list 320. Query term program 500 performs similar comparisons of the terms of second list 320 to the terms of criteria text 240 and deletes matches, and retains or keeps those terms that are not matches. By retaining the non-matching terms, additional semantically related terms may ultimately be added to the query criteria and enhance the recall of the query.

Having deleted terms from the second list, query term program 500 generates a final list of additional query terms (545), and ends. The resulting list of terms, or the third list (L3) includes non-matching semantically related terms that supplements the existing query criteria, and serves to enhance the recall of the query and maintain the precision of the query.

Figure 6:
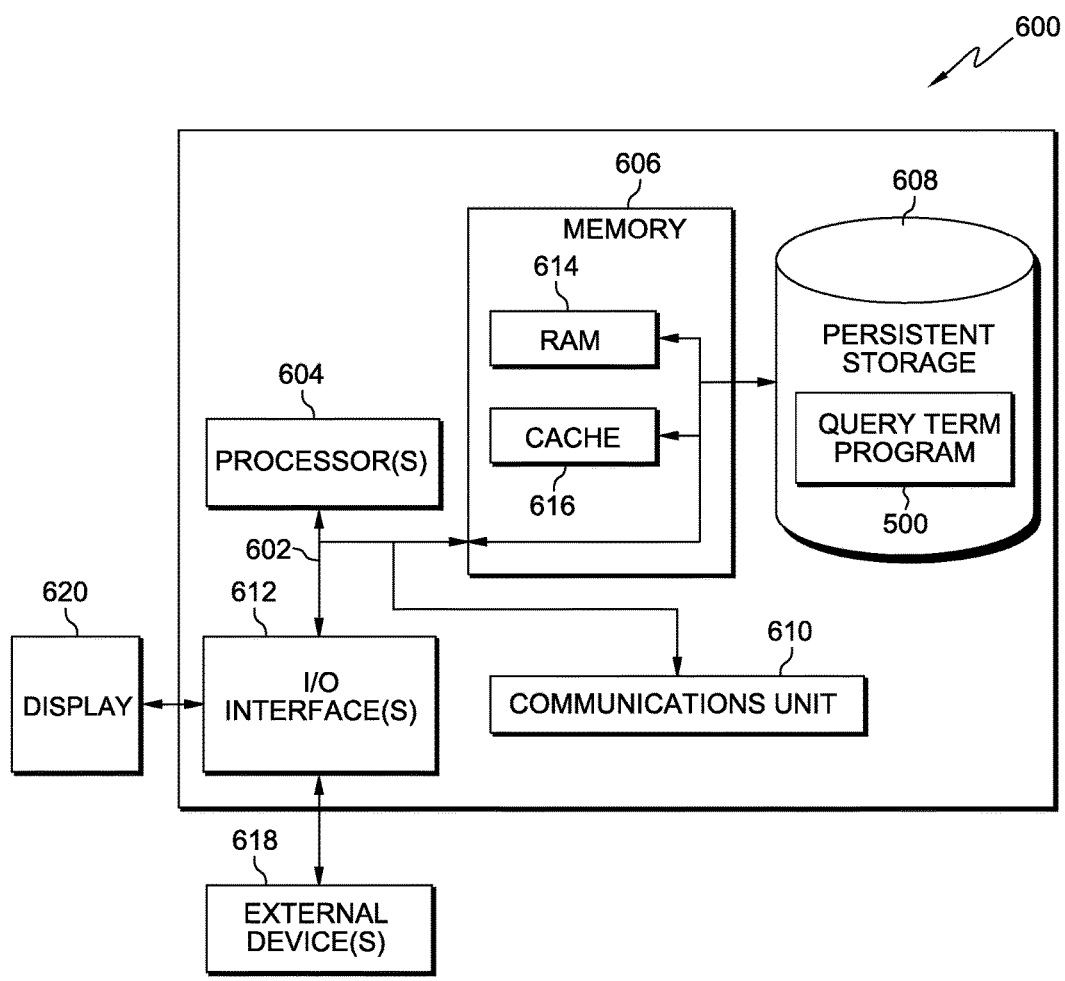
FIG. 6 depicts a block diagram of components of the server computer executing the query term program, in accordance with an embodiment of the present invention.

FIG. 6 depicts a block diagram of components of computing device 600, and similar to computing device 110, capable of executing query term program 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Query term program 500 is stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of distributed computer processing environment 100. In these examples, communications unit 610 includes one or more network interface cards. Communications unit 610 may provide communications through the use of either or both physical and wireless communications links. Query term program 500 may be downloaded to persistent storage 608 through communications unit 610.

I/O interface(s) 612 allows for input and output of data with other devices that may be connected to computing device 110, training data 130, and domain knowledge base 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., query term program 500 can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining additional terms to expand recall, and maintaining precision of a query, the method comprising:
    receiving a set of criteria terms of a query comprised of unstructured data;
    accessing, by a processor, a source of unstructured training data that includes labelled training data comprised of terms;
    generating, by the processor, a first set of terms from the unstructured training data, by frequency pattern mining of terms within the unstructured training data meeting or exceeding a pre-determined frequency of occurrence threshold;
    extracting from the unstructured training data, one or more additional terms in response to a determination that the one or more additional terms fails to match a term of the first set of terms;
    performing a semantic analysis on the one or more additional terms extracted from the unstructured training data;
    generating, by the processor, a second set of terms by adding one or more additional terms extracted from the unstructured training data to the first set of terms, in response to a determination that the one or more additional terms of the unstructured training data are an inferred match and are semantically related to a term of the set of criteria terms of the query;
    generating, by the processor, a third set of terms, based on removing each term of the second set of terms matching a term of the set of criteria terms of the query; and
    generating, by the processor, an expanded recall, and maintaining precision of the query, based on adding the third set of terms to the set of criteria terms of the query.

2. The method of claim 1, wherein a term of the first set of terms of unstructured training data is text based evidence data.

3. The method of claim 1, wherein a selection of a term within the first set of terms of the unstructured training data for semantic analysis is based on determining that the term of the first set of terms fails to match a term of the second set of terms.

4. The method of claim 1, wherein the semantic analysis includes determining a term most similar to a term of the set of criteria terms of the query, for an instance of unstructured training data in which multiple terms have an inferred match to the set of criteria terms of the query.

5. The method of claim 1, wherein the semantic analysis is performed using a knowledge base of terms related to the set of criteria terms of the query.

6. The method of claim 1, wherein the query is a criteria validation query requiring a decision of whether a condition of the criteria terms of the query is met.

7. The method of claim 1, wherein the unstructured training data is manually generated evidence data for supervised training of criteria decision making functions.

8. The method of claim 1, wherein a term of the unstructured training data is a phrase comprised of a combination of words and symbols.

* * * * *